UNITED STATES PATENT OFFICE.

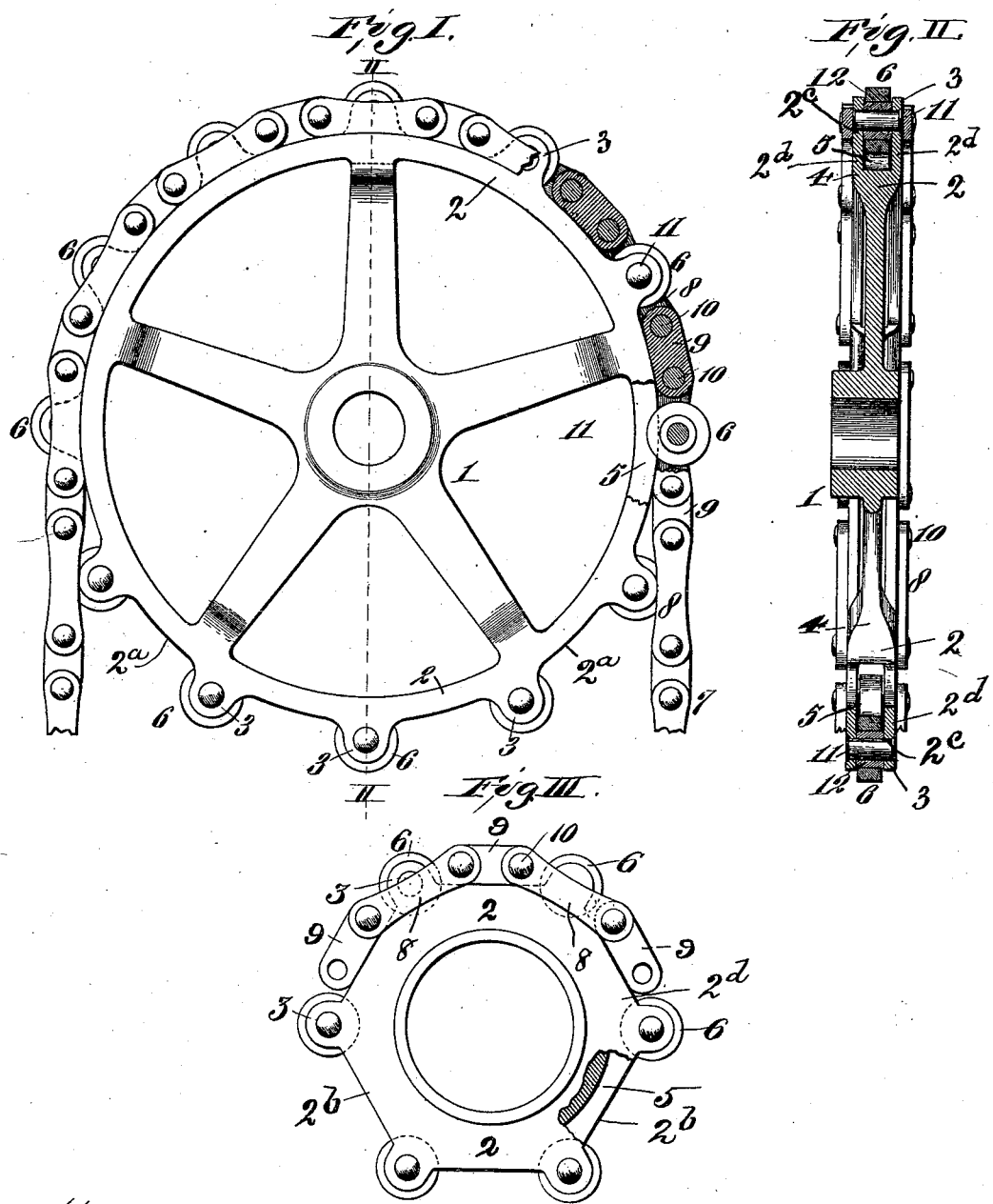

JOHN MOORE, OF ST. LOUIS, MISSOURI.

DRIVE-CHAIN WHEEL.

SPECIFICATION forming part of Letters Patent No. 542,936, dated July 16, 1895.

Application filed April 5, 1894. Serial No. 506,398. (No model.)

*To all whom it may concern:*

Be it known that I, JOHN MOORE, of the city of St. Louis, in the State of Missouri, have invented a certain new and useful Improvement in Drive-Chain Wheels, of which the following is a full, clear, and exact description, reference being had to the accompanying drawings, forming part of this specification.

My invention has for its object to simplify the construction of a drive-chain wheel and at the same time make such a wheel which shall be stronger and more durable than has heretofore been made.

My invention consists in features of novelty hereinafter fully described, and pointed out in the claims.

Figure I is a side view of my improved wheel. Fig. II is a section taken on line II II, Fig. I. Fig. III is a side view showing a modification in the form of the wheel.

Referring to the drawings, 1 represents the spider of the wheel, and 2 the rim having peripheral bosses or sprockets, or paired lips 3, curved edges $2^a$ or straight edges $2^b$ between the bosses, and flanges $2^d$. The edges $2^a$ and $2^b$ are formed with flat surfaces $2^c$. The spider and rim with the bosses are formed integral, the outer ends of the spokes or arms of the spider being enlarged, as shown at 4, Fig. II. After these parts are formed I mill out a deep channel $5^a$ around the rim, thus dividing the rim and the bosses 3 circumferentially of the wheel, so as to form the two flanges, and making a space through the rim and bosses, and thus while the spider and rim with the bosses are integral, yet the rim and bosses are separated by a deep channel which extends entirely around the wheel, and which serves to receive the rollers 6, which engage with and drive the chain 7, the chain being formed of paired links 8, connected together by blocks 9 and pins 10. The blocks 9 are formed to fit or bear on the flat surfaces of the curved or straight edges of the periphery of the rim, so that as the wheel revolves the pivot-points 10 in the chain will neither be above or below, but in circumferential line with the journals in the bosses 3. As the wheel revolves the rollers 6 and paired lips 3 enter between the paired links 8 of the chain and drive the latter. Each pair of links, as shown in Fig. I, are sufficiently far apart to permit the passage of the wheels 6 and the bosses or lips 3 of the wheel, so that the links fit outside of the bosses. The wheels 6 are connected to the bosses 3 by means of pins or rivets 11, passing through the bosses and through the wheels. Surrounding the pins 11 and between each pin and its wheel 6 is a bushing 12, of sufficient length to fit snugly in the channel 5. The width of the wheel 6 is slightly less than the length of the bushing 12, and the result is that when the rivets or pins 11 are tightened the bushings will form distance-blocks and hold the sides of the bosses 3 from coming in contact or pinching the wheels 6, so that the latter are free to revolve upon the bushings.

In Fig. III, I have shown a wheel having a solid web and the usual bosses, in which case the channel 5 is milled through the bosses 3 and into the web to a suitable depth. A wheel thus made is strong and cheap, is not liable to get loose or rattle, and is very durable.

My roller-sprocket is absolutely proof against mud and dust. The construction and principle of the wheel are such that dirt does not in the least affect the running. It is impossible, it matters not how badly the chain is worn or how loosely tensioned or adjusted, to have the chain climb or jump the sprocket. For hill-climbing or heavy road use there is a decided advantage. The chain bears on rollers at a point in direct line of center of rivet, thus preventing any possible chance of the chain climbing the roller-sprocket. The bottom of the block of the chain is perfectly flat, resting on a broad, flat surface, thereby preventing any possible wear of the same. The connecting-links and pivot-pins of the chain span the entire roller and the lips of the sprocket, and in a manner that (it matters not how loose the chain may be) it cannot possibly jump the sprocket. The block of the chain fits reasonably tight between the rollers, and considering that neither the rollers nor blocks wear I entirely dispense with that troublesome "backlash" always experienced in partly-worn sprockets of the ordinary patterns. The channel beneath the rollers provides a clear passage-way for mud or dirt that may have a tendency to accumulate around the rollers. It is simply impossible to block the rollers by such accumulation of dirt, so as to prevent the rollers turning, for the reason that the rollers run comparatively free on the bushings, and the constant back-and-forward strain on the roller keeps any dirt that may accumulate clear from the path of the roller, it being constantly crowded aside by the movement of the roller.

I claim as my invention—

1. The combination of a wheel constructed with a rim having a deep channel and the flanges formed with paired lips and edges having flat surfaces between the paired lips, the pins extending across the paired lips, the rollers encircling the pins, and a chain consisting of paired links embracing the said rollers and the said paired lips, independent of the rim, the blocks fitting between the paired lips and seating on the flat surfaces of the flanges, and the pivot-pins connecting the paired links with the blocks, and having their axes located in the same circumferential line as the axes of the roller-pins when passing around the wheel; substantially as described.

2. The combination of a wheel constructed with a rim having a deep channel, and the flanges formed with paired lips and edges having flat surfaces between the paired lips, the pins extending across the paired lips, the rollers encircling the pins, and a chain consisting of paired links embracing the said rollers and the said paired lips, outside of the rim, the blocks fitting between the paired lips and seating on the flat surfaces of the flanges, and the pivot-pins connecting the paired links with the blocks and having their axes located in the same circumferential line as the axes of the roller-pins when passing around the wheel; substantially as described.

3. The combination of a wheel constructed with a rim having a deep channel, the flanges formed with paired lips and edges having flat surfaces between the paired lips, the bushings forming distance blocks within the paired lips, the pins extending across the paired lips whereby the bushings are clamped to the latter, the rollers of less width than the length of the bushings and mounted on the latter, and a chain consisting of paired links embracing the said rollers and the said paired lips, independent of the rim, the blocks fitting between the paired lips and seating on the flat surfaces of the flanges, and the pivot-pins connecting the paired links with the blocks, and having their axes located in the same circumferential line as the axes of the roller-pins when passing around the wheel; substantially as described.

JOHN MOORE.

In presence of—
A. M. EBERSOLE,
C. G. EDWARDS.